May 12, 1959
B. D. EYTINGE
2,886,439
METHOD FOR PRODUCING POTATO CHIPS
Filed March 18, 1958
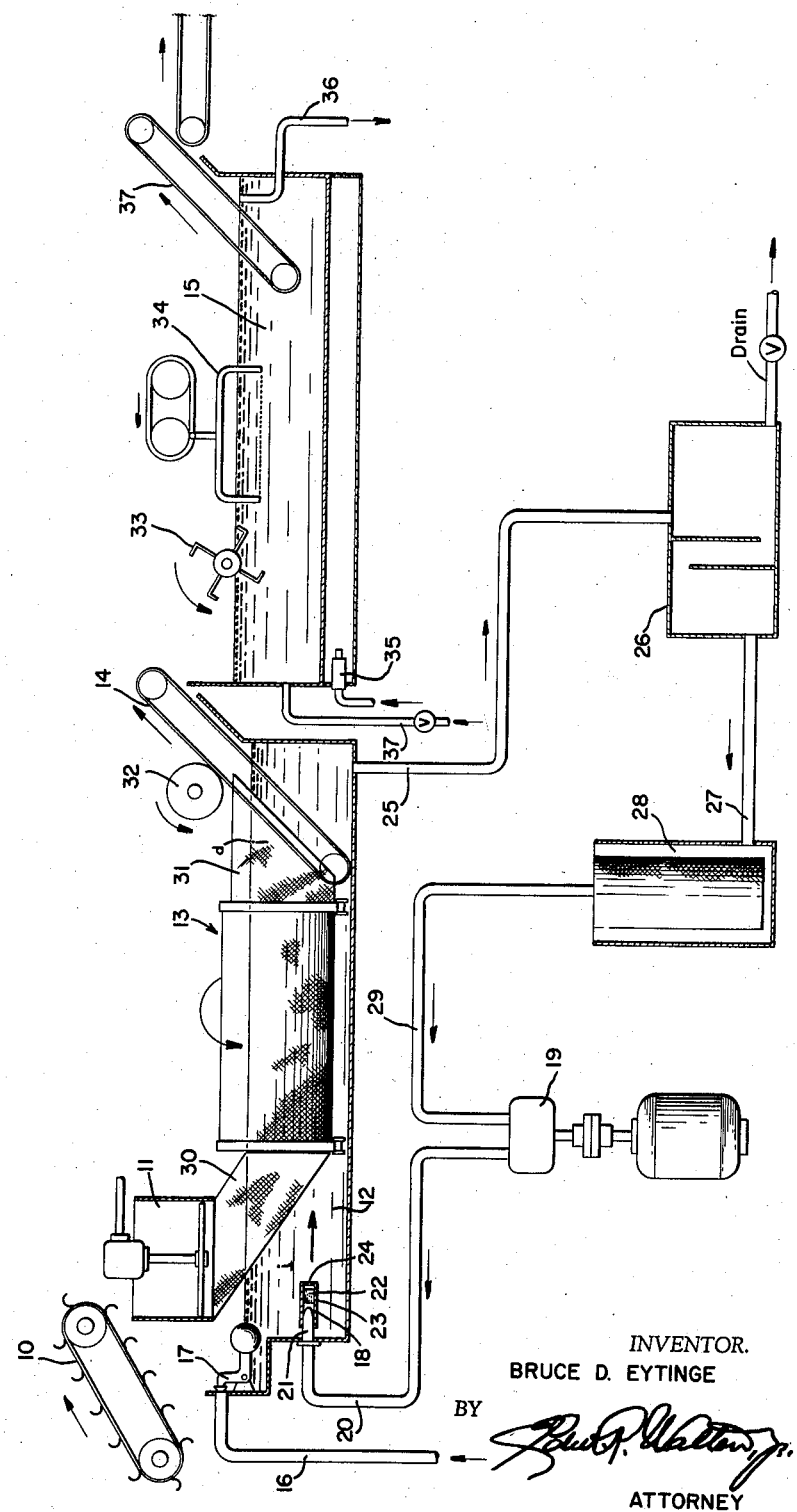
INVENTOR.
BRUCE D. EYTINGE
BY
ATTORNEY ns Patent Office 2,886,439
Patented May 12, 1959

2,886,439

METHOD FOR PRODUCING POTATO CHIPS

Bruce D. Eytinge, near San Antonio, Tex., assignor to The Frito Company, Dallas, Tex., a corporation of Texas Application March 18, 1958, Serial No. 722,205

6 Claims. (Cl. 99—100)

The present invention relates to an improved method for the production of potato chips.

It has been the aim and common endeavor for a long time, of those engaged in the manufacture of potato chips, to obtain superior quality end product—that is, potato chips having a uniform color, a tender texture, yet firm or crisp, and a longer shelf-life. However, efforts in this respect have been hampered by many factors, among which are the quality of the potato to be processed, the tendency of mechanical slicers to tear through the potato resulting in very rough slices, the residual starch left on the surfaces of the slices due to slicing, the enzyme or other chemical action on the potato slices resulting from said slicing—all of which affects the color, tenderness and the shelf-life of the finished product.

It is common knowledge that, in order to obtain a good quality potato chip, (1) it is necessary to hold the amount of loose starch clinging to the potato slices to a minimum; and (2) that mechanical slicing devices have a tendency to tear through the potato leaving fragments of the cell walls and inter-cellular fibres thereon, making a very rough slice. This residual starch seems to form a skin, when the potato slice is fried, and the resulting chip is often unevenly cooked with a poor or mottled color from a yellow to a dark brown. This skin appears to prevent the uniform escape of water from the slices during the cooking operation, as well as to prevent the uniform absorption of the cooking oil into the slices during the cooking operation.

Various attempts have been made to remove this free starch and the ragged or fragmented particles from the surfaces of the slices, some with partial success and others without success. For instance, the general practice has been to employ two washing baths, one which tumbles the slices to strain off small undesirable pieces of potato and the other employing jets of water to wash free starch and jagged particles from the surfaces of the individual potato slices.

The object of the present invention is to remove from the surfaces of potato slices, in the production of fried potato chips, all free starch and fragments of cell walls and intercellular fibre thereon, to mechanically fatigue the cell walls and intercellular fibres and supporting structure of the potato slice for effectively tenderizing the potato slice and to arrest the action of those enzymes which tend to produce the undesirable sugars in an uneven distribution throughout the slice—all resulting in an improved potato chip having a uniform color and texture with a noticeable tenderness than heretofore and having an increased shelf-life.

It has been found that the object of the invention may be attained by subjecting potato slices to ultrasonic energy while in water.

In practice, I subject the potato slices, which are in the conventional wash-tank (having therein the usual revolving foraminated cylindrical tumbling strainer), to the action of ultrasonic energy, while the small undesirable pieces of potato are being screened from the larger slices, and then deliver the slices from said bath or tank directly to the cooking vat, thereby eliminating the necessity for subsequent or a second washing operation.

Other objects will be apparent and a full understanding of the present invention may be had from the following description of the preferred embodiment of the invention, as now practiced, and which will explain more in detail the advantages flowing from my discovery.

The accompanying drawing, which forms a part of this description by reference, illustrates diagrammatically a portion of a conventional potato chip producing apparatus equipped with the present invention.

With reference to the drawing, potatoes, that have been washed and peeled, are delivered to a conveyor 10 from which they are discharged into a slicer 11 which cuts the potatoes into slices ranging between $\frac{1}{18}$ to $\frac{1}{24}$ of an inch in thickness according to the type of potato or the chip desired for the market. Potato slices drop from the slicer 11 into a water tank 12, having a rotating cylindrical strainer 13 at least partially submerged therein. The water used in the tank 12 is at normal temperature, as received from a usual source of city supply or from a well (i.e. 70° F., plus or minus), and flows in such a manner as to cause the potato slices to move along its length into one end of the revolving cylindrical strainer 13. The strainer 13 is foraminous and small undesirable pieces of potato slices pass through its screen-like wall, together with any waste potato products, the larger slices passing from the other end of the cylinder where they are carried by an endless belt 14 and discharged into a cooking vat 15. The water tank 12, cylindrical strainer 13, and conveyor 14 are used in conventional apparatus, and the water in the tank is re-circulated, the tank being provided with a make-up supply 16 controlled in a suitable manner, as indicated by the float valve 17.

It is my discovery that by dissipating ultrasonic energy into the washing water of tank 12, the residual starch particles clinging to the surfaces of the slices as well as fragments of cellulose and intercellular fibres (that result from poor, unclean slicing) are loosened and dispersed from the surfaces of the slices in a very short time when the intensity of this energy is above a certain minimum level. Measurements indicate that the time for accomplishing this is less than one second and microscopic examination of the surfaces of the potato slice, so treated, indicates a perfectly clean structure with all exposed starch and particles washed free from the surfaces. I also find, with respect to the minimum level of intensity of the ultrasonic energy, that as long as there is cavitation in the water caused by said energy, there is sufficient intensity to fulfill the requirements. The maximum frequency may be 60,000 cycles per second or more, with an optimum in the order of 20,000 cycles per second without accompanying annoying audible sounds from the device.

The ultrasonic device employed for this purpose may be selected from any of a number which are now available, but I have indicated, by way of example, a reed-type ultrasonic transducer 18 disposed in the forward end of the tank 12 below the water level therein. This transducer 18 is actuated by a jet of water, under pressure, produced by a pump 19 and delivered to the transducer 18 through the conduit 20 having a nozzle 21 positioned to direct its water jet on a vibratory reed 22 mounted in a cylindrical housing 23 having a discharge opening 24 directing its discharge toward the screening and tumbling strainer 13. Thus, the discharge from the transducer 18 causes a rapid flow of the water through the cylindrical strainer 13 from the forward end of the tank 12 toward the endless conveyor 14 at the rear end portion of the tank 12, where the wash water is conveyed by a conduit 25 to a settling trap 26, from whence it is drawn through pipe 27 to a filter 28 by the pump 19 connected to the filter by pipe 29, thus re-circulating clean filtered water to the tank 12 actuating the transducer 18. While I have illustrated a reed-type ultrasonic transducer, any other type may be employed that may be disposed internally or externally of the tank 12, provided it is of such amplitude that its emitted sonic energy, transmitted to the liquid within said tank, has an intensity sufficient to cause cavitation of the liquid in the tank at the point of emission of said energy thereto.

In order to guide the potato slices from the slicer 11 to the cylindrical screen 13, a foraminous chute 30 is interposed between the discharge end of the slicer and the intake end $i$ of the screen or strainer. Likewise, a foraminous guide 31 is provided between the discharge end $d$ of the cylindrical strainer 13 and the conveyor 14 to direct the passage of the potato slices from the cylinder onto the conveyor 14. As the potato slices pass upwardly on the conveyor belt 14, a compression roller 32 presses any excess water from the potato slices on the belt and the water drains back into the tank 12. The potato slices, so treated, are then discharged from the conveyor belt 14 into the cooking vat 15 equipped with the usual circulating paddle 33 and rake 34.

The cooking vat 15 contains an edible cooking oil maintained at the desirable cooking temperature by a burner 35. The oil may be re-circulated, for the purpose of filtering it to remove any waste therefrom, as indicated at 36 and 37. The cooked potato slices are removed from the cooking vat 15 by an endless belt 37, which discharges them from the apparatus onto a conveyor 38 for delivery at a packaging station, not shown.

By subjecting potato slices to ultrasonic energy in the manner above set forth, (1) residual starch and fragmental particles on the surfaces of the potato slices are loosened and dispersed efficaciously from said surfaces in a minimum of time, irrespective of the quality of the potatoes used (provided, of course, that they are unspoiled and edible), resulting in the slices having clean surfaces; and (2) the finally finished product (i.e. the fried potato chips) has a much more noticeable tenderness, a more even texture and cook more evenly in the frying oil, resulting in the potato chips having a more uniform color than do potato chips whose slices have not been subjected to the ultrasonic treatment.

With respect to the second results, just stated, the reason for these results is not now fully known and no definite explanation is advanced; but, nevertheless, something does occur in the structure of the potato slice. It is, therefore, only suggested that possibly the ultrasonic energy releases enzymes or other substances momentarily in a manner rapid enough to allow a weakening of the cell structure without causing disintegration or collapse of the structure thus producing an ultimate tenderizing effect on the cooked chip (this chemical action being in addition to the mechanical fatiguing of the intercellular fibres and cell walls) and, also, arrests the action of these enzymes or substances which tend to produce the undesirable sugars in an uneven distribution throughout the slice and which sugars cause the spotty browning of the slice during cooking, so apparent in the past. Whatever the effect of the action of the ultrasonic energy upon the structure of the potato slice, it is of relatively short duration—that is, while the slice is passing through the wash-water in tank 12 which requires only about two (2) minutes or less. It is manifest, however, that the ultrasonic treatment of the potato slices affects them in a manner as permits the slices to give up their contained water more evenly, during the cooking, and the cooking oil more evenly absorbed replacing the water, thus resulting in a more even cooking and a more even color throughout the slice and in the cooked potato chip having a longer shelf-life by at least two fold.

Since the actual cleansing action of the potato slices by the ultrasonic energy, as above described, is very rapid, the tank 12 may be only large enough to accommodate the rotating cylindrical strainer 13, where one is employed to remove small slices and waste residue before the desired slices proceed to the conveyor 14 and the cooking vat 15, there being no need for subsequent slice-washing tanks. This, of course, results in a saving of water, equipment and floor space. Should other means be employed to separate the residue from the desired slices, the tank 12 may be reduced to less than half of its size, indicated in the drawing.

The word "water," as employed in this specification and the appended claims, means—water with or without additives.

Having thus described the invention and the manner in which it is to be performed, it is manifest that the objects of the invention have been attained; but it is to be understood that the invention is not to be restricted to the exact steps and devices shown and described as it is susceptible of modifications and variations as fall within the scope of the appended claims.

That which is claimed, as new and to be secured by Letters Patent, is:

1. A method of producing potato chips which includes the steps of slicing peeled potatoes into slices of desired thickness, of placing said slices into a body of water having ultrasonic energy dissipated thereinto, of removing said slices from said body of water before there is disintegration of the slices as a whole and immediately depositing said slice into a cooking vat of heated edible oil.

2. A method of producing potato chips comprising the steps of subjecting slices of potatoes in a water bath to the action of ultrasonic vibrations discharged into a water bath, and then to the action of a cooking oil to fry said slices.

3. A method of producing potato chips comprising slicing peeled potatoes in relatively thin slices, depositing said slices into a body of water subjected to the action of sonic energy therein sufficiently to cause cavitation in said water, separating small pieces of potato and potato waste removed from the slices, interrupting the subjection of said slices to said sonic energy before there is disintegration of said slices as a whole, and then conveying said slices to a hot oil cooking step.

4. The method of producing potato chips comprising the steps of vibrating potato slices in water with sonic energy to fatigue its cellular structure and its intercellular fibres and removing said slices from the influence of said sonic energy before said slices disintegrate, and then subjecting said slices to the action of a cooking oil to fry said slices, thereby producing tenderized cooked potato chips having a uniform color and a longer shelf-like.

5. The method of producing potato chips comprising the steps of transversing slices of raw potatoes through water and, while in said water, subjecting them to ultrasonic energy of a frequency in the order of 20,000 cycles per second and of sufficient amplitude that causes cavitation in the water in the immediate area of the energy discharge and for a period in the order of two minutes as the slices move away from the area of said energy discharge, and then cooking the slices in hot oil, whereby an even color and texture results in the cooked potato chips.

6. A method of producing potato chips including the steps of depositing potato slices into a water bath near a point therein where sonic energy is being dissipated thereinto to cause cavitation of said water, of causing said slices to move in said bath away from the cavitation of said water, of removing said slices from the influence of the action of said sonic energy before said slices disintegrate as whole slices, and then conveying said slices to a hot oil cooking step.

References Cited in the file of this patent

UNITED STATES PATENTS

| | | |
|---|---|---|
| 1,806,302 | Magrill | May 19, 1931 |
| 2,611,705 | Hendel | Sept. 23, 1952 |
| 2,678,599 | Maddocks | May 18, 1954 |
| 2,726,597 | Luke | Dec. 13, 1955 |
| 2,806,246 | Simjian | Sept. 17, 1957 |
| 2,830,912 | Simjian | Apr. 15, 1958 |

UNITED STATES PATENT OFFICE
CERTIFICATE OF CORRECTION

Patent No. 2,886,439

May 12, 1959

Bruce D. Eytinge

It is hereby certified that error appears in the printed specification of the above numbered patent requiring correction and that the said Letters Patent should read as corrected below.

Column 4, line 24, after "indicated in the drawing." insert the following paragraph:

-- As previously stated, the potato slices may be effectively treated in about one (1) second to give the desired end results, when the slices are in the liquid of tank 12 and in close proximity with the transducer 18. However, it is well known that the ultrasonic energy transmitted to the liquid dissipates rather rapidly as the distance is increased from the transducer; and, since the rotary strainer 13 requires a tank of rather large size, the transducer is positioned relative thereto (as generally indicated in the drawings) to compensate for the time the slices are resident in the tank, and moved away from the transducer, without damage to the slices but accomplishing the results intended. Consequently, should a different arrangement be employed from that shown and described, an adjustment of the amplitude of the ultrasonic vibrations will be required (as for instance, in the present showing, by varying the fluid pressure to the transducer 18) to supply sufficient energy to perform the functions above described. --.

Signed and sealed this 23rd day of June 1959.

(SEAL)
Attest:

KARL H. AXLINE

Attesting Officer

ROBERT C. WATSON
Commissioner of Patents